United States Patent [19]

Hoffman

[11] Patent Number: 4,841,310

[45] Date of Patent: Jun. 20, 1989

[54] HIGH PERFORMANCE INK JET PRINT HEAD FOR USE IN A HIGH SPEED PRINTER

[75] Inventor: Arthur R. Hoffman, Owego, N.Y.

[73] Assignee: International Business Machines Corporation, Armonk, N.Y.

[21] Appl. No.: 176,118

[22] Filed: Mar. 31, 1988

[51] Int. Cl.[4] .............................................. G01D 15/18

[52] U.S. Cl. .................................. 346/75; 346/140 R

[58] Field of Search .............................. 346/75, 140 R

[56] References Cited

U.S. PATENT DOCUMENTS 4,587,528 5/1986 Beaudet ................................ 346/75

*Primary Examiner*—E. A. Goldberg

*Assistant Examiner*—Gerald E. Preston

*Attorney, Agent, or Firm*—Douglas M. Clarkson

[57] ABSTRACT

While present-day ink jet print heads are operable technically, they are too inconsistent and unreliable, and none has remained operational for as long as one year. The disclosure describes three structural improvements to these present-day ink jet print heads, any one of which offers a dramatic improvement over present-day head structures. However, if all three improvements described in the disclosure are included in the same print head, as high performance as 100% is available from those produced.

The first improvement described relates to the gasket between the ink reservoir, with its nozzle plate attached, and the drop generator body that encloses the dynamic pressure transducer. If this gasket is formed of very soft material, having a durometer value in the order of 60, then it is only necessary to clamp the plate to the drop generator body with sufficient torque to seat and seal the ink reservoir to prevent ink leakage.

The second improvement described requires a small space between each crystal in a piezoelectric transducer and the washer of acoustic-absorbing material, and the third improvement involves the support rod for these crystals. The support rod should fit with sufficient frictional force to retain the crystals in a preset position, avoiding all unnecessary extra loading of the crystals.

35 Claims, 2 Drawing Sheets

HIGH PERFORMANCE INK JET PRINT HEAD FOR USE IN A HIGH SPEED PRINTER

BACKGROUND

1. Field of the Invention

The present invention, generally, relates to ink jet printers and, more particularly, to the ink jet print head that is used in high speed printers.

While ink jet print heads have been developed in the past that have operated with a measure of success, the reasons for this success have not been understood, and this lack of understanding in this relatively new technical field has contributed to a lack of success in the production of reliably operable print heads. A print head in accordance with this invention, on the other hand, has enjoyed as high as 100% success in the production of operable ink jet print heads.

2. Description of the Prior Art

In order to understand the significance of the contribution that the present invention makes to the production of operable ink jet print heads, a review of the prior art is believed to be helpful.

U.S. Pat. No. 4,245,225 was granted in 1981 to Fillmore, Young and the present inventor and is assigned to the same assignee as the present invention. The ink jet print head described in this prior patent is effective in preventing the propagation of vibrations in a longitudinal direction within the ink cavity, and it is effective in overcoming the other described problems. However, while that structure is effective from an operational viewpoint, it overlooks production considerations that render only about 3 out of every 10 produced operationally effective. This will be described in more detail in connection with the present invention hereinafter.

U.S. Pat. No. 4,245,227 to Krause and assigned to the same assignee as the present invention describes an ink jet print head structure that is operable at a predetermined specific frequency in order to produce ink droplets of a desired size, spacing and rate of movement. This prior patent does not identify production problems or mention any of the solutions that are described in detail hereinafter.

U.S. Pat. No. 4,460,842 was granted in 1984 to Waanders et al. and concerns a specific structural arrangement for the piezoelectric device to obtain a high, constant pre-load force. The description contained in this prior patent actually teaches away from one aspect of the invention and fails to mention any of the other production problems that are solved by the present invention to obtain the high operability rate of the ink jet print heads produced by following the principles of the invention. This will become more readily apparent from the detailed description to follow.

United States pat. No. 4,587,528 was granted more recently, in 1986, to Beaudet and relates to a structure for developing a more uniform breakup of a plurality of ink jet streams into ink drops. In the description of the plurality of piezoelectric elements with "surrounding acoustic isolation material" that is identified as a polyurethane material, there is no mention of the inoperativeness that can result unless the production techniques of the present invention are included. For example, this prior patent teaches the cutting of a plurality of 0.05 inch slots 42 in the transducer 27 to reduce unwanted wave transmission through the transducer, but then, it teaches the "potting" of the transducer 27 with an acoustical isolation material 28. As will be understood from the detailed description hereinafter, this is teaching away from the present invention.

In all ink jet print heads having a plurality of ink jet nozzles connected to an ink reservoir, one measure of successful operation is when the ink droplets produced from the streams of ink passing through each of the nozzles have substantially the same break-off point, are substantially uniform in size, have substantially uniform spacing between the droplets and are free from ink spatter (sometimes called "satellite free"). It is only when the ink jet print heads have these operational characteristics that they will ensure the desired high print quality in a consistent and uniform manner.

In order to manufacture ink jet print heads to obtain this uniformity between the droplets of the several ink streams, it had been considered necessary in the past that such uniformity is obtained by having the perturbations that are applied to each ink stream be substantially uniform and, also, by making the ink nozzles with care to ensure their uniformity. In addition, the ink droplets have been kept satellite free by making these perturbations sufficiently large and uniform.

Even when prior ink jet print heads are manufactured with all of the features and care during production described above, experience has shown that less than half operate with the needed uniformity and consistency. However, by following the production steps and by making the structural changes in accordance with the present invention, the needed improvements in operational characteristics can be realized.

OBJECTS AND SUMMARY OF THE INVENTION

Accordingly, it is a principal object of the present invention to provide structural changes to permit an improved rate of production for useful ink jet print heads.

Also, it is an important object of the invention to provide a new and improved ink jet print head that can be produced with a substantially higher rate of consistency than heretofore available.

Another object of the present invention is to provide an ink jet print head having a plurality of ink jet nozzles that will operate effectively to generate uniform ink droplets.

Still another object of the invention is to provide a structurally elongated ink jet print head to consistently generate droplets of ink that are substantially more uniform.

Yet another object of the present invention is to provide a method of producing ink jet print heads.

Briefly, while the high performance of an ink jet print head mentioned above is obtained by combining all of the features of the invention to be described, a substantial improvement is obtained by including any single feature or any combination less than all.

An ink jet print head that is constructed in accordance with the principles of the present invention includes a system for generating a uniform dynamic pressure wave using a plurality of piezoelectric crystals and a plurality of ink jet nozzles. It has been discovered that a dramatic improvement in the operation of such ink jet print head is obtained by providing a predetermined space between adjacent crystals and by using a resonant cavity to obtain effective pressure waves in the ink.

Another aspect of the invention provides improvement in the operation of such ink jet print head by constructing a centering support for the plurality of piezoelectric crystals which uniquely does not interfere with the resonant pressure waves.

The operation of an ink jet print head is improved, according to still another aspect of the invention, when the plurality of ink jet nozzles is separated from the vibrations that are developed by the piezoelectric crystals.

These and other objects, features and advantages of an ink jet print head according to the invention will be understood better from the following detailed description of presently preferred embodiments, which are described in conjunction with the accompanying drawings.

DETAILED DESCRIPTION OF THE INVENTION

Figure 1:
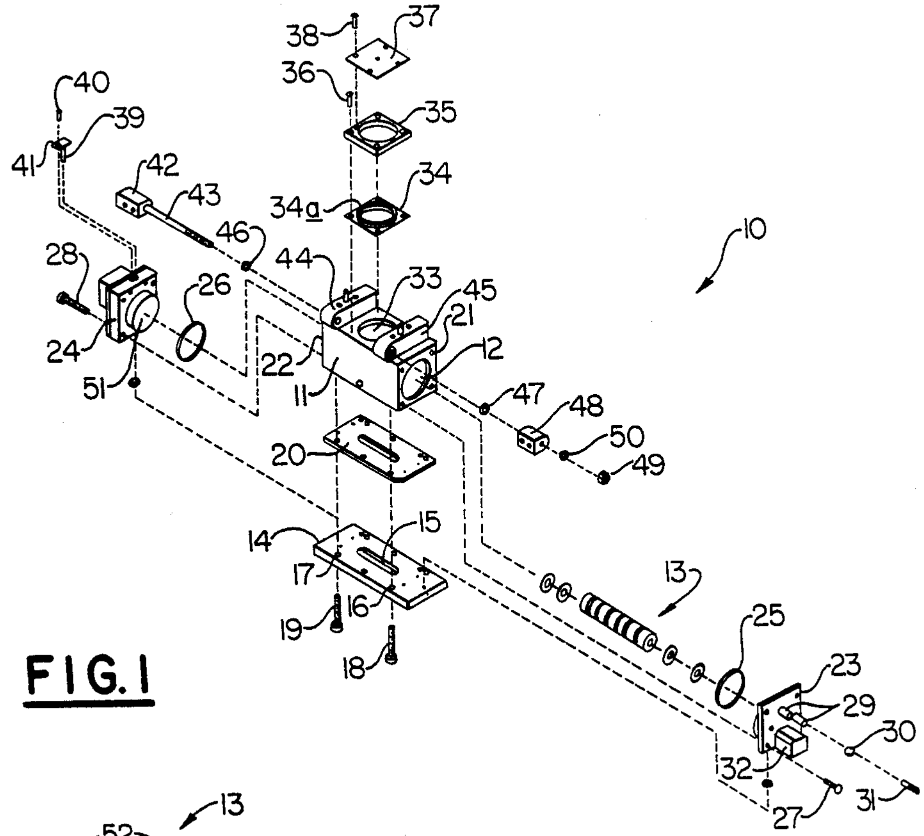
FIG. 1 is an exploded view in perspective to reveal the assembly of an ink jet print head of the invention, as an aid in the following description.

In the various views to be referred to in the following description, the same or comparable component parts will be identified by the same reference numeral.

In FIG. 1, the reference numeral 10 identifies generally the ink jet print head of the present invention. The numeral 11 identifies a drop generator body with a generally cylindrical opening 12 extending axially to receive a cylindrically shaped piezoelectric transducer 13. While the shape of this opening 12 is illustrated as being cylindrical, it is understood that it will bear a predetermined relationship to the outer surface configuration of the transducer 13 in order to define a space that is tuned to be resonant at the operating frequency of the transducer. This is described in more detail in the applicant's prior pat. No. 4,245,225 which is assigned to the same assignee as the present invention.

A face plate is identified by the reference numeral 14. Such face plate 14 is recognized generally in the art as a structure in which an ink reservoir 15 is formed and supports a plurality of ink jet nozzles (not visible in this figure). The ink jet nozzles are usually formed in a glass material and attached to the face plate 14 on the under side of the ink reservoir, as viewed in FIG. 1.

The face plate 14 is formed with a predetermined number of holes, such as holes 16 and 17, through which a plurality of threaded members, such as bolts 18 and 19, are inserted to tighten the face plate 14 against the drop generator body 11. Ink in the reservoir 15 is supplied from the lower part of the opening 12 and is kept from leaking out by means of a gasket 20.

It is the gasket 20 that forms an important aspect of the improvement obtained by the present invention. It has been found that pressure vibrations that are developed in the drop generator body 11 are transferred to the nozzles supported by the face plate 14, resulting in interference with the normal operation of the nozzles to provide uniform cut-off of the ink streams to form ink droplets.

However, to loosen the face plate 14 from being pressed too tightly against the drop generator body 11 by loosening the plurality of bolts, 18, 19, etc., has been shown to produce leakage of ink around the gasket 20. Even forming the gasket 20 of a softer material, taken alone, will not solve the problem.

This problem is solved by selecting a gasket 20 of a material having a low modulus (durometer) value, plus tightening each of the plurality of bolts 18, 19, etc. by only a limited amount, the exact amount of torque being determined by the following considerations:

(a.) flexure of the face plate 14;
(b.) number of bolts;
(c.) location pattern of bolts; and
(d.) softness of the gasket 20.

With the above-listed variables, the requirement for the gasket 20 is best stated as being of sufficient softness so that, when tightened just sufficiently to prevent leakage of ink, there will be no transmission of vibrations from the drop generator body 11 to the face plate 14, i.e., the face plate 14 is isolated from the vibrations developed in the drop generator body 11. Moreover, by this limiting of the torque in tightening the respective bolts around the periphery of the face plate will leave the face plate 14 undistorted or free from being warped, a condition that results all too frequently during production.

The importance of the gasket 20 being formed of a soft material cannot be over-emphasized in order to increase the operation of the ink jet print head 10 in achieving uniformity of break-off of all ink streams to form ink droplets for consistently good print quality. Such a "soft" material is EPDM rubber from West American Rubber Co. of California. To obtain a higher percentage of good, operable ink jet print heads from production, it has been discovered that it is a requirement that the break-off of the ink streams must occur at substantially the same point in time.

Normally, the static pressure of the ink supply is in the order of 60 pounds per square inch, and the frequency of operations of the crystals 13 at about 100 KHz superimposes a slight additional dynamic pressure wave of a variable nature onto this static pressure. Many considerations to solve the problem to obtain consistent operability of the ink jet print heads from production were tried, short of a complete redesign to develop a new approach.

However, the opinion persisted that there was nothing wrong with the basic ink jet print head, as described in the present inventor's prior patent. A gasket 20, as described above, produced a dramatic improvement, and a substantial increase in good operable ink jet print heads from production was obtained for the first time.

Although the ink jet print heads that came from production, after the new gasket 20 was introduced, have been improved substantially in their consistency of operation, the total number of ink jet print heads produced still included a percentage that would not operate properly. It was found that the gasket 20 should have a durometer value of close to 60 in order to be termed "sufficiently soft" to isolate the face plate 14 when the bolts attaching the face plate 14 to the drop generator body 11 were tightened just enough to ensure no leakage of ink.

When the bolts attaching the face plate 14 to the drop generator body 11 are tightened, it is preferred that they be tightened in a particular sequence in order to achieve the benefits provided by the invention. Preferably, they should be tightened from the center outwardly, and if this sequence is followed, the likelihood of there being any flexing or bending of the face plate 14 will be reduced substantially. The face plate 14 should be maintained flat to within two tenths of an inch (0.2″) to avoid a change in the direction of ink from the nozzles attached at the bottom of the face plate 14.

Therefore, the search continued for a truly high performance ink jet print head with substantially 100% consistent operability. Opposite ends 21 and 22 of the drop generator body 11 are closed by end plates 23 and 24, respectively, and sealed by O-rings 25 and 26. The end plates 23 and 24 are detachably secured to the drop generator body 11 by suitably located bolts, such as the bolts 27 (for the end plate 23) and 28 (for the end plate 24), for example.

The end plate 23 is shown with a fitting 29 to receive a ball 30 which is retained in place by a set screw 31, the use of which will be described in more detail presently. While there are two of the fittings 29 shown, only one fitting 32 is shown, and this is to receive an attachment to connect a supply of ink to keep the reservoir 15 in the face plate 14 filled.

There is an opening 33 formed in the upper surface of the drop generator body 11 that is sealed by an expansion diaphragm 34. The expansion diaphragm 34 is retained in place by a plate 35 which has an opening to match the opening 33, and the retainer plate 35 is detachably secured to the drop generator body by means of a plurality of threaded members, such as illustrated by a bolt 36.

A cover plate 37 is fitted over the retainer plate 35 and is attached to the plate 35 by a number of bolts, such as illustrated by a bolt 38 that passes through the cover plate 37 to be threaded into the retainer plate 35. The opening 33 is used after the ink jet print head 10 is assembled and the head cavity is filled with a fluid as part of an expansion means. The head cavity is defined as the space within the opening 12 surrounding the piezoelectric transducer 13 and, also, will be described in more detail presently.

After the cavity is filled with a fluid having the same acoustic wave propagation characteristics as the ink in the ink reservoir 15, all air must be removed from the cavity and from beneath the expansion diaphragm 34, and this is accomplished by using the fittings 29 to bleed away all air. Then, a ball 30 is positioned within each of the fittings 29 and is set in place by set screws, such as illustrated by the set screw 31. The fluid found to be the most effective in an ink jet print head is castor oil.

It should be noted that the expansion diaphragm 34 has a ring 34*a*, the inner diameter of which substantially matches the diameter of the opening 33 and the thickness of which is slightly less than the thickness of the retainer plate 35. This structure gives the expansion diaphragm two stages of operation. A first stage of operation is when the expansion diaphragm 34 plus the ring 34*a* moves, until the ring 34*a* encounters the plate 37 and is limited against further movement. Then, only the part of the expansion diaphragm 34 in the center of the opening within the ring 34*a* moves further.

During the operation of the ink jet print head 10 of the present invention, it is desirable to maintain a continuing monitor of its condition internally. For example, it is desirable to have a way to monitor the temperature of the drop generator body 11, and also, it is desirable to maintain a continuing monitor of the temperature of the ink supply in the reservoir 15, in order to know whether adjustment is needed. For these reasons, a sensor assembly 39 is fitted in the end 24 and secured by a screw 40 through a hole in a flange 41 and threaded into the end 24, as seen in FIG. 1 of the drawings.

To permit convenient access to the respective parts of the ink jet print head 10 while it is in an operable position within a printer mechanism, it is pivotable about a pivot assembly 42 that includes a shaft 43 which passes slideably through blocks 44 and 45 located, respectively, on each side of the opening 33. By this means, the ink jet print head 10 can be pivoted to obtain visual access through the opening 33 to the interior of the cavity containing the piezoelectric transducer 13 and, also, to obtain visual access to the ink jet nozzles at the bottom of the ink reservoir 15 in the face plate 14.

The shaft 43 has a washer 46 on the side of the block 44 and a washer 47 on the side of the block 45. A spacer 48 is located over the end of the shaft 43 to press the washer 47 against the block 45 when a nut 49 that is threaded on the end of the shaft 43 is tightened against a washer 50.

As mentioned previously hereinabove, the opening 12 in the drop generator body 11 extends through the body 11 in order to define an inner cylindrical surface. Between such inner cylindrical surface and an outer cylindrical surface of the piezoelectric transducer 13, the previously mentioned cavity is defined. To locate the piezoelectric transducer 13 accurately, it is supported at each end in openings formed in each of the ends 23 and 24, only the opening 51 being visible in the end 24 in FIG. 1.

Before the structural arrangement of the piezoelectric transducer 13 is described in detail, it is important to note that the arrangement of the piezoelectric transducer 13 and the plurality of ink jet nozzles at the bottom of the ink reservoir 15 in the face plate 14 is that they are co-extensive, in the same direction and are substantially parallel. By this arrangement, it is assured that the dynamic, varying pressure that is superimposed upon the static pressure on the ink supply is uniform at all nozzles.

Figure 2:
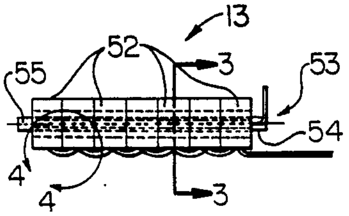
FIG. 2 is a side view of the piezoelectric crystal assembly according to the invention.

The structural arrangement of the piezoelectric transducer 13, according to a further aspect of the invention, will be described now in more detail referring to FIGS. 2, 3 and 4 of the drawings. In FIG. 2, there are seven individual piezoelectric crystals 52 which, taken together, make up the piezoelectric transducer 13. The particular number of piezoelectric crystals 52 is important only in that they are sufficient to extend past the ends of the array of ink jet nozzles in the face plate 14.

The individual piezoelectric crystals 52 are located and supported on a rod assembly, identified generally by the reference numeral 53, and it is this rod assembly and its relationship as a support for the crystals 52 that forms this further aspect of the invention. First, however, so that the description hereinabove concerning FIG. 1 can be completed, the rod assembly 53 extends out from opposite ends of the series of individual crystals 52, as indicated by the ends 54 and 55 in FIG. 2, to be received in openings in the ends 23 and 24, such as the opening 51 that is visible in the end 24 in FIG. 1.

Figure 3:
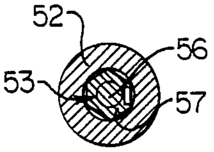
FIG. 3 is a view in cross section taken along the line 3—3 in FIG. 2.

For a better view of the rod assembly 53, refer to FIG. 3 of the drawings, which is a view in cross section taken along the line 3—3 in FIG. 2. In FIG. 3 it can be seen that the crystals 52 are located and supported by six points spaced apart around the rod assembly 53.

While the particular number of support points is not the important consideration, it is an important factor in this aspect of the invention that the rod assembly not fit within the crystals 52 too tightly, i.e., by "too tightly" is meant that the rod assembly will interfere with the effective operation of the piezoelectric transducer 13 if it fits too tightly. Yet, the rod assembly 53 cannot be too loose either.

The fit of the plurality of crystals 52 on the rod assembly 53 is with just sufficient frictional force so as to maintain their location on the rod assembly once set. In the past, it was believed that the crystals should fit tightly on the rod assembly, even bonded to it, but now, it has been discovered that by such a "fit", the normal operation of the crystals is interfered with for their use in an ink jet print head for a printer. Such a "preloading" of the piezoelectric crystals causes them to operate in an inconsistent and unpredictable manner, entirely unsuitable for developing a uniform ink droplet cutoff for an array of ink jet nozzles.

As best seen in FIG. 3, the rod assembly 53 includes a center rod 56, extending outwardly of the transducer assembly 13, FIG. 2, to form the ends 54 and 55. The center rod 56 is formed, preferably, of steel, but it can be formed of any suitable material that is sufficiently rigid to support the assembly 53.

Since the ends 54 and 55 of the steel center rod 56 are fitted into openings in the ends 23 and 24, such as the opening 51 that is visible in the end 23 of FIG. 1, the vibrations developed by the transducer assembly 13, as a dynamic, varying force to be superimposed on the static force on the ink in the ink reservoir 15, will be interfered with by vibrations developed by the same transducer assembly 13 but transmitted through the steel center rod 56, through the rod ends 54 and 55 (FIG. 2), through the ends 23 and 24 (FIG. 1), and into the drop generator body 11.

Previously, such interfering vibrations were considered avoided by using a rubber-like material 57 bonded onto the steel center rod 56 and to a limited extent, perhaps they were. However, in accordance with the present invention, i.e., in order to achieve the high performance of operability from an ink jet print head 10, there are other and further steps that must be taken.

First, the transducer crystals 52 must be "just supported" by the rod 57 of rubber-like material by a fit, as described above, that is readily slideable. Second, contact between the crystals 52 and the rod 57 of rubber-like material must be reduced further and limited to contact points that are spaced-apart around the inner periphery of the transducer crystals 52, such as illustrated in FIG. 3 by a number of points of contact between the rod 57 and the crystals 52, there being six points of contact illustrated in this figure.

Each of the transducer crystals 52 is energized, or "excited", electrically by connections to an electrical source. This aspect of its operation is known in the art and is described in more detail in the inventor's prior pat. No. 4,245,225 which is identified in more detail hereinabove.

While a piezoelectric transducer crystal assembly 13 is identified as the source of dynamic pressure of predetermined, varying characteristics, it should be understood that the invention is not limited to this form of frequency generator. Moreover, it should be understood further that the cavity formed within the opening 12 between the inner surface of the opening 12 and the outer cylindrical surface of the transducer crystal assembly 13 will be predetermined so that it is resonant at close to the operating frequency of the transducer assembly 13.

Finally, to achieve an ink jet print head 10 capable of the highest performance, in accordance with the invention, still another step must be taken. The individual crystals 52 must be more completely isolated from each other than heretofore thought necessary.

Figure 4:
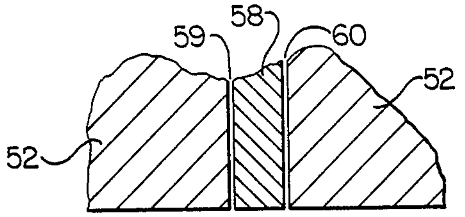
FIG. 4 is an enlarged view in cross section of that portion of FIG. 2 within the circled area 4—4.

In FIG. 4 of the drawings, which is a view of that portion of two transducer crystals 52 within the circled area 4—4 in FIG. 2, one of the spacing washers 58 is illustrated, and although the spacing washers 58 are all formed of a suitable acoustic absorbing material, it has been discovered that there should be no possibility of interference between adjacent crystals 52 when they are vibrating at their normal, designed, predetermined frequency. Structures that were thought in the past to be acceptable, i.e., forming the crystals 52 tightly together, even bonding or potting them, are contrary to the principles of this invention.

According to this invention, a small space, such as spaces 59 and 60, are provided between each transducer crystal 52 and the washer 58 between them. An example of such space 59 and 60 is 0.002 inch. The exact size of the space 59 and 60 is determined by the particular frequency at which the crystals are designed to operate, and the dimension of 0.002 inch is a reasonable approximation or average.

A possible explanation of the function that the spaces 59 and 60 serve is they avoid a detuning effect that may occur when the vibrating crystals come into contact with each other. It is now known that too much space causes a detuning effect, which occurs most likely when vibrations emitted by the individual crystals are reflected in an out-of-phase relationship with each other and with their own incident waves.

Therefore, since the individual transducer crystals 52 expand and contract in their physical dimensions as they vibrate upon being excited electrically, the space between adjacent crystals, such as the spaces 59 and 60, should be just sufficient so that a crystal 52 will not touch one of the spacer washers 58. Then, when a crystal 52 contracts, the space 59 for example will be in the order of 0.002".

It should also be noted that normal operating frequency for ink jet printing is in the order of 100 KHz, and the cavity within the opening 15, FIG. 1, will be tuned to resonate at close to the operating frequency of the ink jet print head 10. For higher print speeds, the ink jet print head 10 will operate at a higher frequency. For these reasons and because the variables involved will depend upon the operating characteristics of a particular print mechanism, a more exact description of the spaces 59 and 60 cannot be identified with greater particularity than above.

Figure 5:
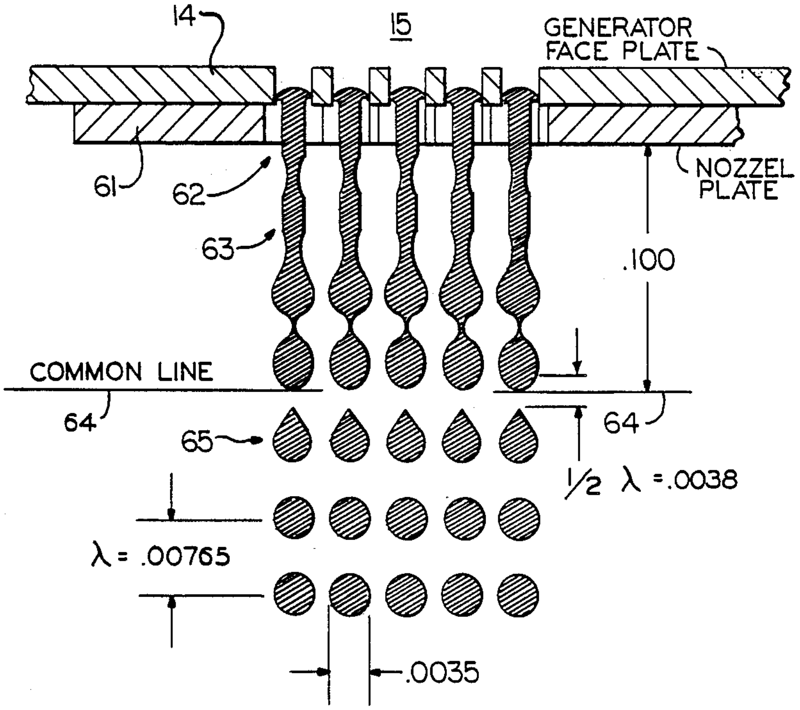
FIG. 5 is a diagrammatic illustration of a plurality of ink droplets that are formed by the ink jet print head of the present invention.

To illustrate the operation of the ink jet print head 10 in accordance with the principles of the invention, reference is made to FIG. 5 of the drawings. In this view, the face plate 14 has the ink reservoir 15 disposed above it, but better seen in this FIG. 5 is a nozzle plate 61 in which is formed a predetermined number of small apertures 62 in a row so that they function as ink jet nozzles, for printing on a medium approximately two inches beneath the nozzle plate 61. The central axis of each nozzle aperture 62 is substantially perpendicular to the longitudinal axis of the transducer assembly 13.

As described previously hereinabove, the static pressure that is maintained on the ink in the ink reservoir 15 above the face plate 14 will ensure the steady flow of ink in streams identified by the numeral 63. However, as also described previously hereinabove, a dynamically varying force is superimposed on the static force to produce an action in the ink streams 63 in addition to the ink being in the streams.

At a point approximately one tenth inch (0.1") from the nozzle plate 61, along substantially a common line 64, the ink streams 63 break off uniformly into ink droplets. This action is termed "perturbation", and is understood in the art, at least theoretically. Then, at a point when it was about to be concluded that it was just theoretical, because these perturbations would develop only about 30% of the time and never for as long as a year, the present invention makes it possible completely.

These dimensions for the ink droplets approximate more closely the point of a pin than the head. However, the significance for the purpose of the present invention is, not that the droplets are formed, but that they are formed uniformly, consistently and with ink jet print heads that now can be made by regular production techniques.

Having described the invention completely with reference to the presently preferred embodiments, it will be apparent to those skilled in this art that modifications and changes can be made, but it is understood that all such modifications and changes that come within the spirit and scope of the claims appended hereto are within the present invention.

What is claimed is:

1. An ink jet print head for use in a high speed printer mechanism for developing a plurality of ink jet streams in a predetermined array and for producing substantially uniformly timed break-off of said streams to form uniform printing droplets of ink, comprising:

means to define a cavity for enclosing an acoustic wave generator for producing dynamic pressure waves;

means to define an ink reservoir for enclosing a supply of ink under a predetermined static pressure and located so that said dynamic pressure waves from said acoustic wave generator are superimposed on said static pressure;

means to define a plurality of ink nozzles located so they are exposed to said supply of ink in said reservoir under said predetermined static pressure for producing a plurality of streams of ink; and means to isolate said plurality of ink jet nozzles from said dynamic pressure waves transmitted through said means to define a cavity, while exposing said supply of ink in said reservoir under said predetermined static pressure to said dynamic pressure waves from said acoustic wave generator to produce substantially uniform break-off of said plurality of streams of ink to form droplets of ink for printing, including gasket means formed of a soft material with a durometer value in the order of 60.

2. An ink jet print head as defined in claim 1 wherein said cavity defined by said means to define a cavity is tuned to resonate at a predetermined operating frequency.

3. An ink jet print head as defined in claim 1 wherein said acoustic wave generator includes a piezoelectric means.

4. An ink jet print head as defined in claim 1 wherein said dynamic pressure waves produced by said acoustic wave generator are at a predetermined operating frequency.

5. An ink jet print head as defined in claim 4 wherein said predetermined operating frequency is in the order of 100 KHz.

6. An ink jet print head as defined in claim 2 wherein said cavity is tuned to resonate at a predetermined operating frequency of approximately 100 KHz.

7. An ink jet print head as defined in claim 1 wherein said means to define a plurality of ink jet nozzles includes face plate means formed separately from said means to define a cavity and attached thereto by said means to isolate.

8. An ink jet print head as defined in claim 1 wherein said means to define an ink reservoir includes face plate means having an elongated opening with inclined sides, and said means to define a plurality of ink jet nozzles includes nozzle plate means attached to said means to define an ink reservoir so that all nozzles receive ink from said ink reservoir.

9. An ink jet print head as defined in claim 1 wherein said acoustic wave generator includes a plurality of individual piezoelectric crystals arranged to define a longitudinal axis.

10. An ink jet print head as defined in claim 8 wherein said acoustic wave generator includes a plurality of individual piezoelectric crystals arranged to define a longitudinal axis, and said acoustic wave generator being enclosed within said cavity so that said longitudinal axis is substantially parallel with said elongated opening in said face plate.

11. An ink jet print head as defined in claim 1 wherein said gasket means includes means formed of soft EPDM rubber.

12. An ink jet print head as defined in claim 1 wherein said means to isolate said ink jet nozzles includes a gasket formed of soft EPDM rubber, and a plurality of threaded members attaching said means to define nozzles to said means to define a cavity with only sufficient torque to seat and seal said means to isolate.

13. An ink jet print head as defined in claim 1 including a plurality of threaded members attaching said means to define nozzles to said means to define a cavity with only sufficient torque to seat and seal said means to isolate.

14. An ink jet print head as defined in claim 6 wherein said acoustic wave generator includes a piezoelectric crystal transducer means.

15. An ink jet print head for developing a plurality of ink jet streams in a predetermined array and for producing substantially uniformly timed break-off of said streams to form uniform printing droplets of ink, comprising:

means to define a cavity for enclosing piezoelectric crystal transducer means for producing dynamic pressure waves;

means to define an ink reservoir for enclosing ink under a predetermined static pressure located so that said dynamic pressure waves are superimposed on said ink;

means to define ink jet nozzles exposed to said ink under static and dynamic pressures for producing streams of ink that have substantially uniform break-off into droplets of ink;

gasket means located between said means to define a cavity and said means to define an ink reservoir, said gasket means being of soft material with a durometer value in the order of 60; and means to define a predetermined adjacent crystals of said piezoelectric crystal transducer means;

whereby resonance is maintained in said cavity without energy loss through said means to define a cavity to said nozzles.

16. An ink jet print head as defined in claim 15 including washer means of an acoustic-absorbing material located between adjacent crystals of said piezoelectric crystal transducer means, and said predetermined space being located between each crystal and said washer means.

17. An ink jet print head as defined in claim 15 wherein said piezoelectric crystal transducer means includes at least seven individual, substantially cylindrical crystals arranged to define a longitudinal axis.

18. An ink jet print head as defined in claim 15 wherein said predetermined space between adjacent crystals of said piezoelectric crystal transducer means is in the order of twenty thousandths inch.

19. An ink jet print head as defined in claim 16 wherein said predetermined space located between each crystal of said piezoelectric crystal transducer means and said washer of acoustic-absorbing material is in the order of twenty thousandths inch.

20. An ink jet print head as defined in claim 15 wherein said piezoelectric crystal transducer means is substantially cylindrical in form with a longitudinal axis, and said transducer means is operable at a predetermined frequency in order to produce resonance in said cavity.

21. An ink jet print head as defined in claim 20 wherein said predetermined frequency at which said transducer means is operable is in the order of 100 KHz.

22. An ink jet print head as defined in claim 21 wherein said means to define ink jet nozzles includes face plate means having means to define an ink reservoir.

23. An ink jet print head as defined in claim 22 wherein said gasket means is located between said means to define a cavity and said face plate means so that said dynamic and static pressures are applied to ink in said reservoir.

24. An ink jet print head as defined in claim 23 wherein said ink reservoir is formed to have a longitudinal axis.

25. An ink jet print head as defined in claim 24 wherein said longitudinal axis of said ink reservoir is substantially parallel with said longitudinal axis of said piezoelectric crystal transducer means.

26. A high performance ink jet print head for use in a high speed printer mechanism for developing a plurality of ink jet streams in a predetermined array and for producing substantially uniformly timed break-off of said ink jet streams to form substantially uniform printing droplets of ink, comprising:

means to define a cavity for enclosing an acoustic wave generator means for producing dynamic pressure waves, said generator means being in the form of a piezoelectric means having a plurality of cylindrical crystals;

means to define an ink reservoir for enclosing a supply of ink under a predetermined static pressure and located so that said dynamic pressure waves are superimposed on said static pressure;

means to define at least one ink jet nozzle to be exposed to said supply of ink in said ink reservoir under said predetermined static pressure for producing a stream of ink through said ink jet nozzle;

means to isolate said ink jet nozzle from said dynamic pressure waves transmitted through said means to define a cavity while exposing said supply of ink in said reservoir under said predetermined static pressure to said dynamic pressure waves from said acoustic wave generator means to produce substantially a uniformly timed break-off of said stream of ink to form droplets of ink;

washer means of acoustic-absorbing material disposed between adjacent ones of said plurality of cylindrical crystals with a predetermined space on each side; and support means for said plurality of cylindrical piezoelectric crystals with sufficient frictional force limited to that necessary to maintain said crystals in a preset position;

whereby said piezoelectric crystals are free to vibrate at a predetermined frequency without interference from either said washer means or said support means to maintain resonance in said cavity.

27. A high performance ink jet print head as defined in claim 26 wherein said cavity defined by said means to define a cavity is tuned to resonate at a predetermined operating frequency.

28. A high performance ink jet print head as defined in claim 27 wherein said means to define at least one ink jet nozzle includes means to define a plurality of ink jet nozzles.

29. A high performance ink jet print head as defined in claim 28 wherein said means to define an ink reservoir includes plate means and said means to isolate includes gasket means of a material having a durometer value in the order of 60.

30. A high performance ink jet print head as defined in claim 29 wherein said gasket means material is soft EPDM rubber.

31. A high performance ink jet print head as defined in claim 30 wherein said means to isolate includes a plurality of threaded means to tighten said plate means for squeezing said gasket means sufficiently to seat and seal thereby preventing leakage of ink from said ink reservoir.

32. A high performance ink jet print head as defined in claim 31 wherein said support means includes means in contact with said piezoelectric transducer crystals at a predetermined number of points.

33. A high performance ink jet print head as defined in claim 32 wherein said plurality of transducer crystals include means defining an opening therethrough, and said support means includes shaft means to extend through said openings.

34. A high performance ink jet print head as defined in claim 33 wherein said support shaft means includes has six points of contact with said transducer crystals.

35. A high performance ink jet print head as defined in claim 34 wherein said predetermined space on each side of said washer means is in the order of twenty thousandths inch.

* * * * *

UNITED STATES PATENT AND TRADEMARK OFFICE

CERTIFICATE OF CORRECTION

PATENT NO. : 4,841,310

DATED : June 20, 1989

INVENTOR(S) : Arthur R. Hoffman

It is certified that error appears in the above-identified patent and that said Letters Patent is hereby corrected as shown below:

Column 10, line 56, after "pressure", insert --and--.
line 67, after "predetermined", insert --space between--.

Signed and Sealed this

Twenty-second Day of May, 1990

*Attest:*

HARRY F. MANBECK, JR.

*Attesting Officer* *Commissioner of Patents and Trademarks*